United States Patent Office 3,553,287
Patented Jan. 5, 1971

3,553,287
POLYMERIZATION OF POLYOLEFINS WITH MACROMOLECULAR COMPOUNDS REACTED WITH ORGANO ALUMINUM COMPOUNDS
André Delbouille, Brussels, and Paul Henrioulle, Marilles, Belgium, assignors to Sobray & Cie, Brussels, Belgium, a corporation of Belgium
No Drawing. Filed June 10, 1968, Ser. No. 735,513
Claims priority, application France, June 22, 1967, 111,450
Int. Cl. C08f 29/12, 37/18; C08g 41/04
U.S. Cl. 260—857                                8 Claims

ABSTRACT OF THE DISCLOSURE

Olefins are polymerized and copolymerized with one another and with diolefins in the presence of a new solid catalyst. The new catalyst is obtained by combining one or more transition metal compounds with the product of reaction of an organoaluminum compound and a macromolecular compound which contains at least one of the following reactive groups $>C=O$, $>C=N$, and $-C \equiv N$.

BACKGROUND OF THE INVENTION

This invention relates to a process for the polymerization of olefins and the copolymerization of olefins with one another and/or with diolefins, in the presence of new solid catalysts.

The polymerization of ethylene in the presence of a catalyst comprising an organometallic compound and a derivative of a transition metal which are both deposited on an inert support, such as preformed polyethylene, has been proposed previously and is described in Belgian Pat. No. 552,550. In this process, the catalyst is simply deposited on the surface of the macromolecular compound and can be eliminated therefrom by physical means, such as by washing.

Another known process for the polymerization of olefins involves the use of a catalyst which has been chemically fixed or bound to a macromolecular compound having reative groups. A number of catalysts capable of chemical bonding have already been described.

Chemically bound catalysts have been formed by the reaction of a derivative of a transition metal with the hydroxyl groups of a macromolecular support, as described in French Pat. No. 1,405,371 issued on May 28, 1964 and assigned to Solvay/Cie. The bonding or fixation reaction may also be carried out by forming a complex of the transition metal derivative with various functional groups. This method is especially useful for preparing chemically bound catalysts involving non-hydroxylated macromolecular supports, as is more fully disclosed in Belgian Pat. No. 681,400 of May 23, 1966, French Pat. No. 1,507,365 filed on Nov. 18, 1966 and Belgian Pat. No. 690,008 issued on Nov. 22, 1966 which patents have been commonly assigned to Solvay & Cie.

SUMMARY OF THE INVENTION

It has now been discovered that solid catalysts having improved properties for the polymerization and, particularly, for the copolymerization of olefins are obtained by chemically bonding the activator to a macromolecular support and thereafter reacting the thus-obtained material with a derivative of a transition metal. According to the invention, the polymerization of olefins and the copolymerization of olefins with one another and/or with diolefins are carried out in the presence of a solid catalyst comprising a combination of one or more transition metal compounds of the Groups IVb, Vb and VIb with the product of reaction between an organoaluminum derivative and a macromolecular compound having at least one of the following reactive groups:

$>C=O$, $>C=N-$ and $-C \equiv N$

DESCRIPTION OF THE PREFERRED EMBODIMENTS

The following are preferred macromolecular compounds used for the preparation of the new catalysts of the invention:

Polymers and copolymers of $\alpha$-$\beta$ unsaturated nitriles, such as polyacrylonitrile, polymethacrylonitrile and the copolymers of acrylonitrile and methacrylonitrile with ethylenically unsaturated monomers, such as acrylonitrile-styrene copolymers.

Polyamides derived from lactams especially from lactams containing from 4 to 12 carbon atoms and from $\omega$-aminocarboxylic acids containing from 6 to 12 carbon atoms, in particular polycaprolactam and the polymer derived from 11-aminoundecanoic acid.

Polyamides obtained by the polycondensation of diamines with diacids especially from diamines and diacids containing from 4 to 10 carbon atoms, in particular poly(hexamethylene adipamide) and poly(hexamethylene sebacamide).

Other macromolecular compounds may also be used successfully, such as the polymers and copolymers derived from the esters of acrylic, methacrylic, fumaric, itaconic acid, and esters of other $\alpha,\beta$-unsaturated acids, the polymers obtained by polymerization and copolymerization of vinyl esters, especially vinyl esters of saturated carboxylic acids, such as polyvinyl acetate and the copolymers of vinyl acetate with other ethylenically unsaturated monomers, the polyvinyl lactams, such as the polyvinyl pyrrolidone, and the polyurethanes, derived from diisocyanates such as tolylene diisocyanate and hydroxyterminated polyesters and polyethers.

The macromolecular compounds used as catalytic supports preferably have high molecular weights, so that they do not dissolve and remain insoluble in the solvents used for the polymerization, and in most cases also in the solvents used for the preparation of the catalyst. Macromolecular compounds with molecular weights in excess of 2000, preferably from 5000 to 50,000 have been used successfully.

Other macromolecular compounds which have $>C=O$ functional groups can also be used. However in some cases, special care must be taken. This is especially necessary when polyesters and polycarbonates are used and, in general, is necessary with respect to all compounds having ester groups in the main chain. It has been found that unless special measures are taken, which involve essentially limiting the reaction temperature and the quantity of the organoaluminum derivative, a cleavage of some of the ester bonds may occur with the result that the polymer used as a support is degraded. As with the reduction of the esters by alkylaluminum compounds, it is believed that the cleavage of the ester bond occurs according to the following mechanism:

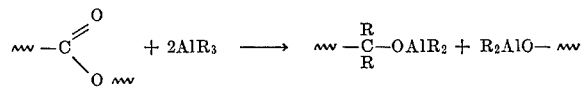

This breaking of the macromolecular chain results in products which are less suitable as constituents of the present polymerization catalysts.

The organoaluminum derivatives which are used to react with the macromolecular compounds in accordance with the invention are preferably those of the formula $AlR_2X$ where R is a hydrocarbon radical, and X is a hydrocarbon radical or a halogen atom.

All compounds of this general formula may be chemically fixed or bound to the previously described macromolecular compounds to produce the desired catalyst of the invention. Particularly useful alkylaluminum compounds include:

tri-n-alkylaluminum compounds in which the alkyl group contains from 1 to 16 and preferably 2 to 6 carbon atoms, such as triethylaluminum tri-n-propylaluminum, and tri-n-hexylaluminum, triisoalkylaluminum or tricycloalkylaluminum compounds in which the alkyl group comprises from 3 to 16 carbon atoms and preferably 4 to 6 carbon atoms, such as triisobutylaluminum and tricyclohexylaluminum, triarylaluminum compounds such as triphenylaluminum, dialkylaluminum halides in which the halogen is selected from the group containing fluorine, chlorine, bromine and iodine, and the alkyl group is a normal or isoalkyl group containing from 1 to 16 carbon atoms and preferably 2 to 6 carbon atoms, most preferably diethylaluminum chloride.

The mechanism of the reaction between the macromolecular compound and the organoaluminum derivative is not known with certainty. However, it is believed that there is an addition reaction of the organoaluminum derivative to the multiple bonds, i.e., $>C=O$, $>C=N-$ and $-C\equiv N$ of the macromolecular compound. Similar addition reactions have been described for the reduction of nitriles and of esters by using organoaluminum derivatives in British Pat. No. 903,178 issued on July 11, 1956 to K. Ziegler.

By way of example, the reaction between an organoaluminum derivative and the polyacrylonitrile may be described by the following mechanism:

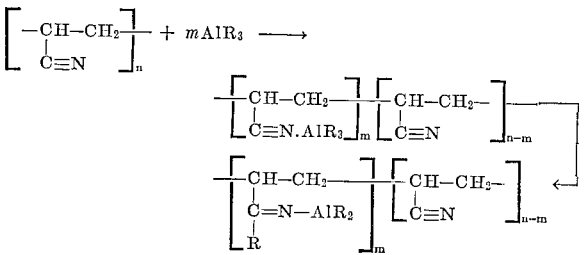

In the formula $AlR_3$, R is a hydrocarbon radical.

In this case, a straight addition reaction is involved without the elimination of reaction products.

However, it has been recognized that triisoalkylaluminum compounds do not behave in the same manner. When they react with the macromolecular supports, there is a loss of weight.

With triisobutylaluminum, it has been determined that the loss of weight corresponds to the elimination of a ative to the multiple bonds, i.e., $>C=O$, $>C=N-$ and observed.

By way of example, the reaction between an organo-
These facts may be explained by the following reactions, with regard to reactions with polyacrylonitrile:

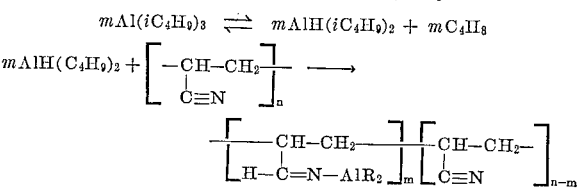

Similar mechanisms will explain the reactions of triisoalkylaluminum compounds with the other macromolecular compounds.

After the reaction, it has been found that the organoaluminum compound is chemically bound or fixed to the polymer and cannot be separated therefrom by physical means, such as by washing.

The reaction between the organoaluminum compound and the macromolecular compound should be carried out in the absence of humidity and oxygen. Preferably, the reaction is carried out in a hydrocarbon solvent containing the organoaluminum compound dissolved therein. Hydrocarbon solvents which are used include pentane, hexane, isooctane, cyclohexane, xylene and Tetralin.

The reaction may be carried out at room temperature or at a temperature which may be as high as the boiling temperature of the solvent; the higher temperature is used when it is found that a lower temperature does not produce satisfactory bonding. For a given quantity of the reactive groups contained in the polymer which bond the organoaluminum groups, it is advantageous to bond as high a quantity as possible of the organoaluminum derivative to the polymer, in order to limit the quantity of the polymer used during the polymerization.

In practice, the bonding reaction uses a slight excess of organoaluminum derivative with respect to the reactive groups of the polymer.

However, even though it is highly desirable that the saturation of the reactive groups of the support by the organoaluminum radicals be as complete as possible, complete saturation, i.e. bonding of all of the reactive groups is not essential to obtain active catalysts. Useful catalysts may also be obtained from macromolecular supports having organoaluminum radicals bound to only a small fraction of the available reactive groups.

On the other hand, it is essential that the final polymerization catalyst be obtained in the solid state and that it is not dissolved in the hydrocarbon solvent.

For this reason, a preferred embodiment of the invention involves adjusting the conditions of the reaction involving an organoaluminum compound to prevent dissolution of the macromolecular compound. In this case, the solid product resulting from the reaction between the organoaluminum compound and the macromolecular compound is thereafter washed with an anhydrous hydrocarbon solvent, then reacted with the transition metal compound to produce the solid polymerization catalyst.

There is another way to obtain a solid catalyst even when the product of the reaction between the organoaluminum compound and the macromolecular compound is dissolved in the reaction solvent. This method involves reprecipitating the polymer having the organoaluminum compound bound thereto, by the addition of a transition metal compound.

Transition metal compounds used for the catalysts of this invention are preferably selected from the halides, oxyhalides and alkoxyhalides of the metals of Groups IV$b$, V$b$ and VI$b$ of the Periodic Table. Titanium tetrachloride, vanadium oxychloride and chromium oxychloride are particularly suitable for the preparation of these catalysts. Combinations of two or more of these compounds may also be used, in particular, mixtures of titanium tetrachloride and vanadium oxychloride.

Generally, the complex catalyst and of the transition metal derivative (M) are used in such proportion that the atomic ratio Al/M in the resulting catalyst is between 1.5 and 30, preferably between 3 and 15.

The preparation of the catalyst may be carried out immediately before the introduction of the monomers; it is also possible to allow the catalyst to age for a more or less extended period of time, at room temperature or even at a more elevated temperature. It is also possible to add an organoaluminum compound to the polymerization mixture.

The process of the invention may be used for the polymerization of olefins and the copolymerization of olefins with one another and/or with diolefins and especially for the production of copolymers of ethylene and propylene, of ethylene and butadiene and the terpolymers of ethylene, propylene and a non-conjugated diene. The new catalysts have increased activities with respect to the production of polymers and the polymers obtained have improved properties.

These catalysts have been found to be particularly interesting for the production of elastomeric copolymers of ethylene and propylene. They may be used to carry out the copolymerization of ethylene and propylene in the absence of a solvent by using a mixture of the liquid monomers. The resulting products are characterized by an amorphous structure and have excellent elastomeric properties. The excellence of the elastomeric properties of the present polymer products is particularly surprising in view of the fact that polymer products produced under identical conditions, except for the use of known catalysts, comprising the same transition metal compound and the same organometallic activator but wherein the organometallic compound is not chemically bound to the macromolecular support, have definite crystallinity and are poor elastomers.

Another surprising discovery with respect to the present catalysts is that contrary to catalysts free of macromolecular support, the use of titanium derivatives, and in particular titanium tetrachloride is particularly advantageous when copolymerizing ethylene and propylene and also for the production of terpolymers of ethylene, propylene and a non-conjugated diene. It is well known that using prior polymerization catalysts similar to the present catalysts except for the absence of a macromolecular support, the best elastomeric copolymers and terpolymers are obtained with vanadium containing catalysts. By using the process of this invention, it is possible to copolymerize non-conjugated dienes with one or more monoolefins such as ethylene, propylene or butene-1.

The non-conjugated dienes which may be used in the process according to the invention may be selected from the following groups:

non-conjugated aliphatic dienes such as pentadiene-1,4, hexadiene-1,4, hexadiene-1,5;
non-conjugated monocyclic dienes such as 4-vinylcyclohexene-1,3, divinylcyclohexane, cycloheptadiene-1,4, cyclooctadiene-1,5;
non-conjugated cycloaliphatic dienes having an endocyclic bridge such as dicyclopentadiene, norbornadiene and ethylidene-norbornene.

Particularly interesting polymers, useful as elastomers, which may be vulcanized with sulphur are obtained by using the new catalysts according to the invention; such polymer products include ethylene-propylene-dicyclopentadiene terpolymers and ethylene - propylene - hexadiene-1,4 terpolymers.

According to this invention, the present catalysts are also suitable for the copolymerization of olefins with conjugated diolefins.

The polymerization and the copolymerization may also be carried out according to well known procedures, in the gaseous phase, in the absence of any liquid solvent medium of the monomer or in the presence of a dispersing medium in which the monomer is soluble. An inert hydrocarbon, which is liquid under the polymerization condiditions or the monomer itself, maintained liquid under its saturation pressure may be used as a dispersing liquid medium.

The following examples are given in order to further illustrate the best mode contemplated for carrying out this invention, but they must not be construed as limiting in any manner whatsoever the scope and spirt of the invention.

EXAMPLE 1

(a) Bonding reaction

The reaction is carried out in a cylindrical reactor heated by a double jacket, provided with a stirrer and having a sintered glass plate and an evacuation tube at the lower portion thereof. The reactor comprises inlet tubes at the upper portion thereof and gas exits to flush the reactor with an inert gas.

Into this reactor there is introduced:
5 g. of a polyacrylonitrile, obtained by suspension polymerization in the presence of lauroyl peroxide at 60° C. for 3 hours, and having an intrinsic viscosity of 0.75 l./g. measured at 20° C. in dimethylformamide;
100 ml. of dry hexane;
then, slowly and under strong stirring conditions, 25 ml. or 19.6 g. of triethylaluminum.

The temperature of the mixture is raised to 60° C. and is maintained therein for 1 hour. The mixture is cooled, the liquid is eliminated through the sintered glass plate, the solid is washed four times with approximately 100 ml. of dry hexane, and is dried under vacuum.

There are obtained 15 g. of the solid catalyst, which indicates that 10 g. of triethylaluminum have been bonded. An analysis of the product has revealed that it has an aluminum content of 169 g./kg. which corresponds to the bonding of 10.7 g. of triethylaluminum. This bonded quantity of triethylaluminum corresponds to reaction with 100% of the nitrile groups present in the polymer used for the reaction.

The infra-red spectrometric analysis of the polyacrylonitrile before and after the bonding reaction, has revealed the complete disappearance of an absorption band at $4.48\mu$ attributed to the $C{\equiv}N$ group. At the same time, an absorption band has appeared at $6.17\mu$ corresponding to the $C{=}N$ group.

(b) Preparation of the catalyst

Into a glass flask provided with a lateral tubular opening, there are introduced:

2.026 g. of the solid catalyst component prepared as indicated above;
25 ml. of dry hexane;
236 mg. of titanium tetrachloride or 1.24 mols, in a Al/Ti ratio of 10.2.

These ingredients are allowed to react for about 2 minutes, then introduced into the polymerization autoclave.

(c) Tests for the polymerization of ethylene with propylene and dicyclopentadiene Into a 5 liter autoclave which is dry and has been flushed with propylene, there are successively introduced the catalytic suspension prepared as described above in (b), 23.0 g. of dicyclopentadiene and 2.175 liters of liquid propylene.

The mixture is stirred and the temperature of the autoclave is raised to 40° C. Then, hydrogen under a partial pressure of 0.05 kg./cm.$^2$ and ethylene are introduced therein so as to obtain a total constant pressure of 19.1 kg./cm.$^2$. The liquid phase contains 92.5 mols of propylene per 100 mols of ethylene and propylene. The polymerization lasts 2 hours approximately by continuously introducing 24.8 g. of dicyclopentadiene. The total amount of dicyclopentadiene introduced during the polymerization is as high as 0.6 mol per 100 mols of the mixture of monomers.

After 2 hours, the gases are removed from the autoclave, the resulting product is separated and is treated by steam distillation to eliminate the dicyclopentadiene which is not bonded. The product is dried under vacuum at 50° C.

There is produced 272 g. of an ethylene-propylene-dicyclopentadiene terpolymer containing 23 mol percent of propylene, having a double bond content of 0.66 ethylenic groups g. per kg. and a Mooney viscosity ML(1+4) at 100° C. of 103. The catalytic activity is 576 g. of terpolymer per g. of titanium tetrachloride per hour.

EXAMPLE 2

By using the solid catalyst prepared in Example 1(a), a polymerization catalyst is produced from VOCl$_3$ according to the process described in Example 1(b) by mixing:

2.493 g. of the solid catalyst component;
25 ml. of dry hexane;
249 mg. of $VOCl_3$.

Ethylene, propylene and dicyclopentadiene are copolymerized under the same conditions as given in Example 1(c) and after 1 hour and 30 minutes, there are obtained 338 g. of a terpolymer containing 34 mol percent of propylene, having an unsaturation of 0.24 ethylenic groups g. per kg., and a Mooney viscosity ML(1+4) at 100° C. of 65. The catalytic activity is 905 g. of terpolymer per g. of $VOCl_3$ per hour.

EXAMPLE 3

By using the solid catalyst component prepared according to Example 1(a) and under the conditions given in Example 1(b), a mixed catalyst is prepared from:

2.840 g. of the solid catalyst component;
25 ml. of dry hexane;
118 mg. of $TiCl_4$;
41 mg. of $VOCl_3$.

The terpolymerization is carried out under the conditions given in Example 1(c), and 389 g. of a terpolymer are obtained after a reaction period of 1 hour. The terpolymer contains 26 mol percent of propylene and has an unsaturation of 0.32 ethylenic groups g. per kg. Its Mooney viscosity ML(1+4) at 100° C. is 74. The catalytic activity is 1.880 g. of terpolymer per g. of titanium tetrachloride+vanadium oxychloride per hour.

EXAMPLES 4-12

Starting from polyacrylonitrile which is identical to that used in Example 1, a series of solid catalysts which will be used in combination with titanium tetrachloride and vanadium oxychloride are prepared for the copolymerization of ethylene with propylene and dicyclopentadiene. The results of these tests are given in Table 1 hereinbelow. They show the high activity of the catalysts according to the invention.

The elastomers obtained can be vulcanized very easily by using a sulphur formula. The vulcanized materials so produced have excellent mechanical properties.

EXAMPLE 13

Into a stainless steel 3 liter autoclave, dry and flushed with dry ethylene, there are successively introduced:

a hexane suspension of a catalyst obtained by mixing 0.275 g. of the solid catalyst prepared under the conditions given in Example 11 and containing 169 g. of aluminum per kg., with 0.340 g. of pure titanium tetrachloride;
1 liter of pure and dry hexane.

The mixture is heated to 80° C., and hydrogen under a pressure of 4 kg./cm.$^2$ and ethylene under a pressure of 2 kg./cm.$^2$ are introduced therein. The pressure is maintained constant by continuous introducing ethylene. After 5 hours, 15 g. of polyethylene are obtained.

TABLE 1

Bonding reaction

| Ex. No. | Quantity of polyacrilonitrile used, g. | Alkylaluminum compound Formula | Alkylaluminum compound Quantity, g. | Length of reaction, min. | Temperature of reaction, °C. | Quantity of solid catalyst obtained, g. | Aluminum content of solid catalyst, g./kg. | Reaction rate of active groups of polymer, percent |
|---|---|---|---|---|---|---|---|---|
| 4 | 23.5 | $Al(iC_4H_9)_3$ | 19.6 | 60 | 60 | 36.3 | 67 | 20 |
| 5 | 23.5 | Same as above | 19.6 | 60 | 60 | 36.3 | 67 | 20 |
| 6 | 7.5 | do | 7.8 | 60 | 60 | 12.0 | 76 | 24 |
| 7 | 7.5 | do | 7.8 | 60 | 60 | 12.0 | 76 | 24 |
| 8 | 10.2 | do | 39.2 | 60 | 55 | 27.7 | 109 | 56 |
| 9 | 10.2 | do | 39.2 | 60 | 55 | 27.7 | 109 | 56 |
| 10 | 6.0 | do | 23.6 | 60 | 50 | 20.0 | 119 | 78 |
| 11 | 5.0 | $Al(C_2H_5)_3$ | 20.9 | 60 | 60 | 15.0 | 169 | 100 |
| 12 | 10.2 | $Al(iC_4H_9)_3$ | 29.2 | 60 | 55 | 27.7 | 109 | 56 |

Preparation of catalyst and polymerization

| Example No. | Amount of $TiCl_4$, g. | Amount of $VOCl_3$, g. | Amount of solid catalyst, g. | Al/Ti+V atomic ratio | Aging period at 65° C., min. | Amount of dicyclopentadiene mol percent per mol of mixture | Time of polymerization, min. |
|---|---|---|---|---|---|---|---|
| 4 | | 0.083 | 2.355 | 12.1 | 60 | 0.4 | 90 |
| 5 | 0.118 | 0.041 | 4.097 | 10.2 | | 0.4 | 210 |
| 6 | 0.157 | | 3.333 | 11.3 | 60 | 0.4 | 120 |
| 7 | | 0.166 | 4.515 | 13.3 | 60 | 0.4 | 60 |
| 8 | 0.267 | | 3.554 | 10.2 | | 0.6 | 120 |
| 9 | | 0.158 | 2.200 | 9.8 | | 0.6 | 90 |
| 10 | 0.153 | 0.054 | 2.643 | 9.2 | | 0.4 | 270 |
| 11 | 0.094 | 0.033 | 1.839 | 14.8 | | 0.4 | 90 |
| 12 | 0.172 | | 2.382 | 10.6 | | | 120 |

Terpolymer obtained

| Example No.: | Quantity, g. | Catalytic activity g. terpolymer per hr. per g. $TiCl_4+VOCl_3$ | $C_3$ content mol percent per mol of terpolymer | C=C content, C=C groups, g./kg. | Mooney viscosity at 100° C. ML(1+4) |
|---|---|---|---|---|---|
| 4 | 79 | 635 | 34 | 0.26 | |
| 5 | 276 | 496 | 28 | 0.38 | 82 |
| 6 | 58 | 185 | 21 | 0.90 | 86 |
| 7 | 128 | 771 | 37 | 0.20 | 87 |
| 8 | 273 | 511 | 23 | 0.48 | [1] 92 |
| 9 | 327 | 1,380 | 31 | 0.23 | [1] 60 |
| 10 | 219 | 235 | 26 | 0.45 | [2] 96 |
| 11 | 293 | 1,538 | 31 | 0.40 | [2] 71 |
| 12 | [3] 329 | 955 | 36 | ([3]) | |

[1] Polymerization in the presence of 0.1 kg./cm.$^2$ of hydrogen.
[2] Polymerization in the presence of 0.05 kg./cm.$^2$ of hydrogen.
[3] Copolymer of ethylene and propylene.

EXAMPLES 14–18

Samples of solid catalysts are prepared by reacting triisobutylaluminum with a high molecular weight polycondensation product derived from ω-aminoundecanoic acid, sold under the trademark Rilsan 80/200. This product melts at 186° C. and has a relative viscosity of 1.39 when measured at 20° C. in a 5 g. per liter solution in sulphuric acid.

The bonding reaction is terminated after 1 hour. The reaction temperature and the quantity of the products used for the reaction, the amount of products obtained and the analytical data concerning these products are given in Table 2 hereinbelow. The data and the amount of product indicate that alkylaluminum is bonded on the support in the form of a hydride of diisobutylaluminum. This conclusion is confirmed by the fact that the bonding reacting is accompanied by an evolution of a gas which has been identified as isobutene.

The above solid catalysts have been used in combination with titanium tetrachloride and for some specific tests, with vanadium oxychloride for the copolymerization of ethylene with propylene and for the terpolymerization of ethylene, propylene and dicyclopentadiene under the conditions given in Example 1(c).

The conditions of these tests and the results appear in Table 2 which follows.

at 22° C. produces 31 g. of a solid catalyst containing 66 g. of aluminum per kg. The reaction rate of the

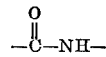

groups of the polymer is 43%.

Upon examining the solid catalyst by infra-red spectrometry, it is found that there is a definite weakening of the band corresponding to the C=O groups of the starting polymer (6.1μ) accompanied by a displacement of the band corresponding to the —NH— group from 6.4 to 6.3μ. This indicates that the bonding reaction is made through the C=O groups of the polyamide.

2.317 g. of this solid catalyst are used as described in Example 1 with 0.157 g. of titanium tetrachloride in 25 ml. of hexane. The resulting catalyst is used, after a 60 minute period of aging, at 65° C. for a terpolymerization test involving ethylene, propylene and dicyclopentadiene under conditions similar to those described in Example 1.

However, the total proportions of the different monomers in the liquid phase are the following.

ethylene: 95.2 mole percent per mol ethylene+propylene
propylene: 7.5 mole percent per mol ethylene+propylene
dicyclopentadiene: 0.4 mol percent per mole of the mixture.

TABLE 2

| | Bonding reaction | | | | | |
|---|---|---|---|---|---|---|
| Example No.: | Quantity of polyamide used, g. | Quantity of Al(iC₄H₉)₃ used, g. | Reaction Temperature, ° C. | Quantity of solid catalyst obtained, g. | Al content of solid catalyst, g. | Reaction rate of active groups of polymer, percent |
| 14 | 21 | 19.6 | 25 | 30 | 61 | 59 |
| 15 | 22 | 19.6 | 25 | 34 | 68 | 72 |
| 16 | 22 | 19.6 | 25 | 34 | 68 | 72 |
| 17 | 22 | 19.6 | 25 | 34 | 68 | 72 |
| 18 | 7.8 | 8.6 | 60 | 12.7 | 81 | 90 |

| | Preparation of catalyst and polymerization | | | | | | | |
|---|---|---|---|---|---|---|---|---|
| Example No. | Amount of TiCl₄, g. | Amount of VOCl₃, g. | Amount of solid catalyst, g. | Al/Ti+V atomic ratio | Aging of catalyst Temperature, °C. | Duration, min. | Amount of dicyclopentadiene mol percent per mol of mixture | Time or polymerization, min. |
| 14 | 0.173 | | 4.567 | 11.4 | 22 | 30 | | 180 |
| 15 | 0.224 | 0.078 | 7.318 | 10.0 | 65 | 60 | 0.4 | 220 |
| 16 | 0.393 | | 8.117 | 9.9 | 65 | 60 | 0.4 | 75 |
| 17 | 0.153 | 0.053 | 5.275 | 10.5 | 65 | 60 | | 180 |
| 18 | 0.118 | 0.041 | 2.855 | 8.8 | 65 | 60 | 0.4 | 210 |

| | Co- or terpolymer obtained | | | | |
|---|---|---|---|---|---|
| Example No.: | Quantity, g. | Catalytic activity g. copolymer per h. per g. TiCl₄+VOCl₃ | C₃ content copolymer, mol percent per mol of polymer | C=C content, C=C groups, g./kg. | Mooney viscosity 100° C. ML(1+4) |
| 14 | 205 | 395 | 34 | | 63 |
| 15 | 142 | 128 | 28 | 0.40 | 97 |
| 16 | 107 | 218 | 28 | 0.46 | 108 |
| 17 | 279 | 449 | 30 | | 49 |
| 18 | 44 | 55 | 26 | n.d. | n.d. | n.d.=not determined.

EXAMPLE 19

According to the process described in Example 1, 15.7 g. of triisobutylaluminum are reacted with 20 g. of a powdered polycondensation product of the polyamide type derived from caprolactam. The product which is used sold under the name Polyamid-TPU-W by Griesheim A.G. and has an intrinsic viscosity of 0.124 liter per g. measured in a concentrated sulphuric acid solution at 20° C.

The bonding reaction which is carried out for 1 hour

After 325 minutes, the polymerization has yielded 59 g. of a terpolymer which corresponds to a catalytic activity of 63 g. of terpolymer per hour per g. of titanium tetrachloride.

The resulting terpolymer is characterized by a propylene content of 24 mols per 100 mols of terpolymer, an unsaturation of of 0.57 groups g. of C=C per kg. of terpolymer and a Mooney viscosity ML(1+4), measured at 100° C., of 125.

EXAMPLE 20

The reaction of the polycaprolactam Polyamid-TPU-W with triisobutylaluminum is repeated, but this time at 60° C. for 1 hour. By using 13.5 g. of polycaprolactam and 27.4 g. of $Al(iC_4H_9)_3$, there are obtained 26.2 g. of a solid catalyst containing 92 g. of aluminum per kg. The reaction rate of the

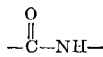

group is 75%.

The catalyst prepared from 4.211 g. of this solid catalyst and 0.267 g. of titanium tetrachloride has supplied, without aging, and under conditions identical to those given in Example 1, 264 g. of terpolymer which corresponds to a catalytic activity of 330 g. of terpolymer per hour per g. of titanium tetrachloride.

EXAMPLES 21–28

A series of solid catalysts are prepared by reacting various trialkylaluminum compounds and alkylaluminum halides with a powdered polyamide derived from adipic acid and hexamethylenediamine (Nylon 66). This product which is sold under the trademark Zytel 42 by du Pont de Nemours has an intrinsic viscosity of 0.204 liter per g. measured in a concentrated sulphuric acid solution at 20° C.

The conditions under which the above bonding reactions have been carried out and the polymerization tests are given in Table 3. The operation is identical to the one given in Example 1.

The terpolymer of Example 23 has been submitted to a more thorough examination. After drying, it is homogenized by extrusion, and its intrinsic viscosity in Tetralin at 120° C. has been measured to be: $(\eta) = 0.24$ l./g.

The product was then vulcanized at 160° C. by using the following mixture:

| | Parts |
|---|---|
| Elastomer | 100 |
| HAF black | 50 |
| Stearic acid | 1 |
| Zinc oxide | 5 |
| Tetramethylthiuram disulphide | 1.5 |
| Mercaptobenzothiazole | 0.5 |
| Sulphur | 1.5 |

The mechanical properties of the vulcanized elastomer are the following:

| | After 20 min. vulcanization | After 30 min. vulcanization |
|---|---|---|
| 100% modulus of elongation, kg./cm.² | 47 | 55 |
| 300% modulus of elongation, kg./cm.² | 201 | 235 |
| Breaking rate, kg./cm.² | 278 | 276 |
| Elongation at rupture, percent | 416 | 359 |
| Permanent elongation, percent | 15 | 14 |
| Goodrich heating at 38° C | | 54 |

The above results show the extreme facility of vulcanizing terpolymers by using a sulphur vulcanizing agent and the excellent mechanical properties of the vulcanized materials, in particular, the Goodrich heating.

TABLE 3

Bonding reaction

| Ex. No. | Quantity of polyamide used, g. | Alkylaluminum compound Formula | Quantity, g. | Length of time of reaction, min. | Temperature of reaction, °C. | Quantity of solid catalyst, obtained, g. | Al content of solid catalyst, g./kg. | Reaction rate of active groups of polymer, percent |
|---|---|---|---|---|---|---|---|---|
| 21 | 3.5 | $Al(iC_4H_9)_3$ | 7.8 | 60 | 60 | 8.0 | 94 | 90 |
| 22 | 13.4 | Same as above | 23.6 | 60 | 60 | 28.4 | 95 | 84.5 |
| 23 | 13.4 | do | 23.6 | 60 | 60 | 28.4 | 95 | 84.5 |
| 24 | 13.4 | do | 23.6 | 60 | 60 | 28.4 | 95 | 84.5 |
| 25 | 12.5 | do | 24.3 | 60 | 60 | 26.2 | 95 | 84.2 |
| 26 | 16.6 | $Al(C_2H_5)_3$ | 16.7 | 60 | 60 | 27.1 | 108 | 74 |
| 27 | 12.2 | $Al(nC_3H_7)_3$ | 19.1 | 60 | 60 | 18.6 | 74 | 47 |
| 28 | 12.3 | $Al(C_2H_5)_2Cl$ | 17.7 | 60 | 60 | 24.2 | 118 | 98 |

Preparation of catalyst and polymerization

| Example No. | Amount of TiCl₄, g. | Amount of VOCl₃, g. | Amount of solid catalyst, g. | Al/Ti+V atomic ratio | Aging Period at 65° C., min. | Amount of Dicyclopentadiene mol percent per mol of mixture | Time of polymerization, min. |
|---|---|---|---|---|---|---|---|
| 21 | 0.118 | 0.041 | 2.453 | 8.8 | 60 | 0.4 | 120 |
| 22 | 0.177 | 0.062 | 3.433 | 8.3 | | 0.4 | 180 |
| 23 | 0.251 | | 3.736 | 10.0 | | 0.4 | 210 |
| 24 | | 0.216 | 3.521 | 9.9 | | 0.4 | 180 |
| 25 | 0.251 | | 3.725 | 10.0 | | 0.6 | 180 |
| 26 | 0.177 | 0.062 | 3.206 | 8.8 | | 0.4 | 310 |
| 27 | 0.177 | 0.062 | 3.432 | 6.4 | | 0.4 | 340 |
| 28 | 0.177 | 0.062 | 4.661 | 14.0 | | 0.4 | 120 |

Terpolymer obtained

| Example No.: | g. terpolymer Quantity, g. | Catalytic activity per hr. per g. TiCl₄+VOCl₃ | C³ Content mol percent per mols of terpolymer | C=C content, C=C groups, g./kg. | Mooney Viscosity at 100° C. ML(+4) |
|---|---|---|---|---|---|
| 21 | 345 | 1,085 | 27 | 0.32 | 80 |
| 22 | 394 | 550 | 31 | 0.43 | ¹ 96 |
| 23 | 262 | 298 | 25 | 0.52 | ¹ 127 |
| 24 | 115 | 177 | 25 | n.d. | ¹ 87 |
| 25 | 352 | 401 | 21 | 0.46 | ² 130 |
| 26 | 112 | 94 | 30 | n.d. | 75 |
| 27 | 177 | 131 | 29 | n.d. | 92 |
| 28 | 324 | 678 | 32 | n.d. | ¹ 56 |

¹ Polymerization in the presence of 0.05 kg./cm.² of $H_2$.
² Polymerization in the presence of 0.1 kg./cm.² of $H_2$.
NOTE.—n.d.=not determined.

EXAMPLE 29

5.72 g. of polyvinylpyrrolidone suspended in 50 ml. of heptane are reacted with 10.5 g. of triisobutylaluminum. The temperature is gradually raised to 60° C. and a total dissolution of the polymer appears after about 15 minutes.

1.95 g. of titanium tetrachloride are added with the immediate appearance of the formation of a voluminous precipitate. After 10 minutes, the precipitate is filtered and is carefully washed with dry hexane. There are produced 10 g. of a catalyst containing 72 g. of aluminum per kg.,
35 g. of titanium per kg.

4.517 g. of this catalyst are introduced into a dry 5 liter autoclave flushed with nitrogen. Therein are introduced 2.175 ml. of liquid propylene, and the mixture is stirred and the temperature is raised to 40° C. Ethylene is introduced to maintain a constant total pressure of 19.1 kg./cm.$^2$. The liquid phase contains 92.5 mole of propylene per 100 mols of ethylene and propylene. Polymerization is carried out for 4 hours and 40 minutes by continuously introducing 35.2 g. of dicyclopentadiene, or 0.4 mol of dicyclopentadiene per 100 mols of the mixture of monomers.

After having removed the gases, steam distillation and drying, there are obtained 330 g. of an ethylene-propylene-dicyclopentadiene terpolymer containing 27 mol percent of propylene, having a catalytic activity of 115 g. of terpolymer per hour per g. of titanium tetrachloride.

Although specific embodiments of this invention have just been described, it is understood that modifications are permissible according to the invention, the scope of which is to be determined from the appended claims only.

EXAMPLE 30

(a) Bonding reaction

The preparation is effected in the same apparatus as the one used in the foregoing examples.

There is introduced in the reactor maintained under nitrogen atmosphere:

13.94 g. of poly(vinyl acetate) obtained by bead polymerization (Rhodopas HV1);
150 ml. of dry and pure hexane;
then slowly and under strong stirring conditions, 23 ml. or 19.2 g. of pure triethylaluminum.

The temperature of the mixture is raised to 50° C. and is maintained therein for 1 hour and 45 minutes.

The mixture is cooled, the liquid is eliminated through the sintered glass plate, the solid is washed with approximately 10 times 100 ml. of dry hexane, and is then dried under vacuum at 50° C.

22.2 g. of solid catalyst are obtained, the analysis of which indicates an Al content of 96 g./kg.

(b) Preparation of the catalyst 2.2 g. of the solid catalyst are introduced in a 25 ml. dry autoclave under nitrogen atmosphere, then 7.5 ml. of hexane and 300 mg. of pure TiCl$_4$ are added. This mixture is reacted for 15 minutes at 25° C.

(c) Polymerization test

This catalyst is introduced in a 1.5 liter autoclave, which is dry and has been flushed with pure propylene; then pure and dry hydrogen under a pressure of 200 g./cm.$^3$ and 335 g. or 670 ml. of liquid propylene are introduced.

The autoclave is heated at 40° C. under stirring then the total pressure is brought to 19.3 kg./cm.$^2$ by addition of ethylene. The liquid phase contains 92.5 mols of propylene per 100 mols of ethylene and propylene mixture.

The polymerization lasts 4 hours at constant temperature and pressure. 17 g. of an ethylene-propylene copolymer containing 28 mol percent of propylene are obtained.

What we claim and desire to secure by Letters Patent is:

1. Process for the polymerization of olefins and the copolymerization of olefins with one another and with diolefins which comprises carrying out said polymerization and copolymerization in the presence of a catalyst comprising the reaction product of one or more transition metal compound selected from the group consisting of the elements of Groups IV*b*, V*b* and VI*b* of the Periodic Table with the product obtained by reaction of an organoaluminum compound and a macromolecular compound having at least one of the functional group $>C=O$, $>C=N-$ and $-C\equiv N$ and selected from the group consisting of polyamides, polyesters, polyurethanes, and polymers and copolymers derived from nitriles and esters of alpha, beta-ethylenically unsaturated acids, vinyl esters and vinyl lactams, the atomic ratio of aluminum to transition metal compound being between 1.5 and 30.

2. Process according to claim 1, in which said organoaluminum derivative is selected from the group consisting of tri-n-alkylaluminum, triisoalkylaluminum, triarylaluminum and dialkylaluminum halide.

3. Process according to claim 1, in which said organoaluminum compound is a tri-n-alkylaluminum containing 2 to 6 carbon atoms, a triisoalkylaluminum containing 4 to 6 carbon atoms or an alkylaluminum chloride containing 2 to 6 carbon atoms.

4. Process according to claim 1 in which said organoaluminum compound is triisobutylaluminum, triethylaluminum or diethylaluminum chloride.

5. Process according to claim 1, in which said transition metal compound is selected from the group consisting of halides, oxyhalides, alkoxyhalides of titanium, vanadium and chromium.

6. Process according to claim 1 in which said transition metal compound is selected from the group consisting of titanium tetrachloride, vanadium oxychloride, chromium oxychloride and mixtures thereof.

7. Process according to claim 1 in which the reaction is the copolymerization of ethylene and propylene.

8. Process according to claim 1 in which the reaction is the copolymerization of ethylene, propylene and a nonconjugated diene.

References Cited

UNITED STATES PATENTS

| | | | |
|---|---|---|---|
| 3,326,870 | 6/1967 | Nakaguchi | 260—897 |
| 3,483,274 | 12/1969 | Bacskai | 260—878 |

PAUL LIEBERMAN, Primary Examiner

U.S. Cl. X.R.

260—80.78, 85.3, 88.2, 94.9, 859, 873, 895, 897